United States Patent [19]

Ammar

[11] Patent Number: 4,643,458
[45] Date of Patent: Feb. 17, 1987

[54] SUPPORT AND CLAMPING ASSEMBLY

[76] Inventor: Jesse I. Ammar, 26 Crow Trail, Scarborough, Ontario, Canada, M1B 1X4

[21] Appl. No.: 597,640

[22] Filed: Apr. 6, 1984

[51] Int. Cl.[4] ............................................. F16L 3/10
[52] U.S. Cl. ..................................... 285/62; 285/412; 180/296
[58] Field of Search ............... 285/62, 412, 368, 261, 285/400, 413, 414, 415; 180/296; 248/60, 62

[56] References Cited

U.S. PATENT DOCUMENTS

| | | | |
|---|---|---|---|
| 3,008,735 | 11/1961 | Wijnagaarden | 285/61 |
| 3,704,995 | 12/1972 | Heckethorn | 285/412 |
| 3,942,599 | 3/1976 | Shimada | 180/296 X |
| 4,159,043 | 6/1979 | James | 180/296 |
| 4,321,726 | 3/1982 | Rogers et al. | 285/413 X |
| 4,393,559 | 7/1983 | Heckethorn et al. | 285/382.2 X |
| 4,397,486 | 8/1983 | Ohya | 285/412 X |
| 4,519,639 | 5/1985 | Florian | 285/412 X |

FOREIGN PATENT DOCUMENTS

| | | | |
|---|---|---|---|
| 2522726 | 9/1983 | France | 285/412 |
| 4167 | of 1888 | United Kingdom | 285/412 |

Primary Examiner—Dave W. Arola
Attorney, Agent, or Firm—Rogers, Bereskin & Parr

[57] ABSTRACT

A support and clamping assembly has two brackets. A first bracket is adapted to be mounted around the outlet of a catalytic converter. It is capable of replacing an original mounting flange, and includes two bracket members which can be secured behind a weld bead of the original flange. To support the catalytic converter, this first bracket is attached to support straps. A second bracket is mounted on the flared end of a muffler pipe, and studs or bolts connect the two brackets together to secure the muffler pipe to the converter. The second bracket comprises third and fourth bracket members, and the studs securing it to the first bracket also serve to hold these two bracket members together.

9 Claims, 4 Drawing Figures

SUPPORT AND CLAMPING ASSEMBLY

This invention relates to a support and clamping assembly.

In recent years, various countries have introduced emission control regulations, setting limits on the level of various substances in the exhaust gases from internal combustion engines. In order to meet these requirements for a car, at the present time it is common to fit a catalytic converter. The converter includes a relatively complex and costly catalytic element. The regulations typically require that the converter is maintained in good operating condition throughout the life of the vehicle.

In comparison to the rest of the exhaust or muffler system, it has been found that the catalytic converter has a longer life. Although it tends to operate at a higher temperature than the rest of the exhaust system, its body is normally made from better material and tends not to corrode so fast.

However, one problem that is frequently encountered with catalytic converters is failure of the mounting bracket at the outlet of the converter. From current experience, approximately 60% of work carried out on exhaust systems involves replacing the muffler, while the remaining 40% involves just replacing the bracket of the catalytic converter.

Replacing the bracket of the catalytic converter is difficult, and it is quite often not done correctly. In fact, many repair shops will replace the entire catalytic converter, rather than attempt to repair the damaged bracket of an existing converter. One method of repairing a converter bracket is to fit a new bracket. However, this typically involves taking a one piece bracket, splitting it, heating it to expand it, and then fitting it around the outlet of the converter. The bracket then has to be contracted and then welded into position. Welding it into position is frequently difficult, as the outlet of the converter cannot readily be accessed. Also, in many vehicles, the various components are closely crowded together and it is easy to damage other components, such as electrical cables, when welding. Because of the difficult access, the weld is frequently not properly made. It is thus desirable to provide some means to enable a bracket of a catalytic converter to be replaced.

According to the present invention, there is provided a support and clamping assembly for clamping together an outlet pipe of a catalytic converter having an annular projection and an end of a muffler pipe having an outwardly flared end portion, and for supporting an outlet of the catalytic converter, the support and clamping assembly comprising:

a first support bracket, which comprises first and second bracket members, each of which has first and second apertures for securing the bracket members together around the outlet of a catalytic converter, the first and second apertures of one bracket being complimentary to the second and first apertures of the other bracket, each of which bracket members defines a recess, the recesses together being capable of accomodating the outlet of a catalytic converter, and each of which bracket members includes a hole for a stud, the first bracket being adapted to be secured to support straps; and a second bracket, which comprises third and fourth bracket members, each of which includes third and fourth holes for securing the third and fourth bracket members together around a muffler pipe, the third and fourth holes of the third bracket member being complementary to the fourth and third holes at the fourth bracket member, and each of which includes a second recess, the second recesses together being capable of accomodating a muffler pipe;

whereby, in use, the first bracket is assembled around the outlet of a catalytic converter by means of bolts in the first and second apertures securing the first and second bracket members together, the first bracket being retained by an annular projection of the outlet pipe, and the second bracket is assembled around the end of a muffler pipe by means of studs located in the third and fourth holes, the second bracket being retained by a flared end portion of the muffler pipe and the studs further passing through the holes of the first and second bracket members to secure the first and second brackets together and thereby secure the muffler pipe to the outlet of the catalytic converter.

The present invention also provides a method of fitting a clamping assembly as just described, the method comprising the steps of:

(a) Positioning the first and second bracket members of the first bracket around the outlet of the catalytic converter and behind the annular projection thereof;

(b) Securing the first and second bracket members together by nuts and bolts located in the first and second apertures;

(c) Attaching the first bracket to a support strap, to support the catalytic converter;

(d) Positioning the third and fourth bracket members around the end of the muffler pipe;

(e) Passing studs through the third and fourth complimentary holes of the third and fourth brackets to secure the second bracket in position, and through the first and second holes of the first bracket;

(f) Attaching nuts to the ends of the studs, to draw the first and second brackets together and thereby to clamp the outlet of the catalytic converter to the end of the muffler pipe.

The clamping assembly of the present invention, and the method of fitting it, are expected to provide a greatly simplified method of repairing a damaged catalytic converter mounting bracket. Typically, the mounting bracket of the converter will corrode around the weld securing it to the outlet pipe although the weld bead remains intact. If this occurs, then it is a relatively simple matter to cut away the damaged or corroded mounting bracket, whilst ensuring that the catalytic converter is adequately supported. This is effected, whilst leaving the original weld bead in place. Then, the two parts of the first bracket can be fitted around the outlet. As the weld bead is still present, they are conveniently fitted behind the weld bead, so that they will press against it. As an alternative, they can be fitted behind a flared end of the outlet pipe, forming the coupling surface of it.

The first and second bracket members are conveniently stamped from sheet steel, and at least one aperture of each bracket should be elongate to enable the brackets to be fitted as closely as possible to the outlet pipe. They are then clamped together by nuts and bolts. It is not necessary for the first bracket to tightly clamp the outlet pipe. It is sufficient for it to be secured with a small clearance so that it fully abuts the weld bead or flared end of the outlet, so that it cannot be pulled off. At this stage, the first bracket is preferably attached to the mounting strap. Normally, there will be two mounting straps. A special opening in the main body of the two bracket members can be provided with a bolt for securing it to one strap. For the other strap, either another special opening can be provided, or conveniently the bolt securing one end of the two clamping members together, also serves to secure the one bracket of this other support strap.

With the catalytic converter now securely mounted again, the second bracket for the muffler pipe can be fitted. Similarly to the first bracket, the third and fourth bracket members are fitted around the end of the muffler pipe. Then, studs are passed through the holes in the third and fourth clamping members and in the first and second clamping members. Conveniently, these studs are fitted, with a nut already installed on one end. Then, after insertion of the stud, nuts are fitted into the other end and tightened. This draws the first and second brackets towards one another. The first bracket is pressed against the weld bead or flared end of the outlet depending on how it is fitted. The second bracket is pressed against the flared end of the muffler pipe, and the flared end portion is pressed against the coupling surface of the outlet of the catalytic converter.

As an alternative to studs, long bolts can be used. However, studs are preferred, as one size of studs will do a variety of different vehicles, and there is a saving in the number of different parts that have to be stocked.

For a better understanding of the present invention, and to show more clearly how it may be carried into effect, reference will now be made by way of example, to the accompanying drawings, which show a preferred embodiment of the present invention, and in which:

FIG. 4 shows a vertical section through the arrangement of FIG. 2, as assembled.

Figure 1:
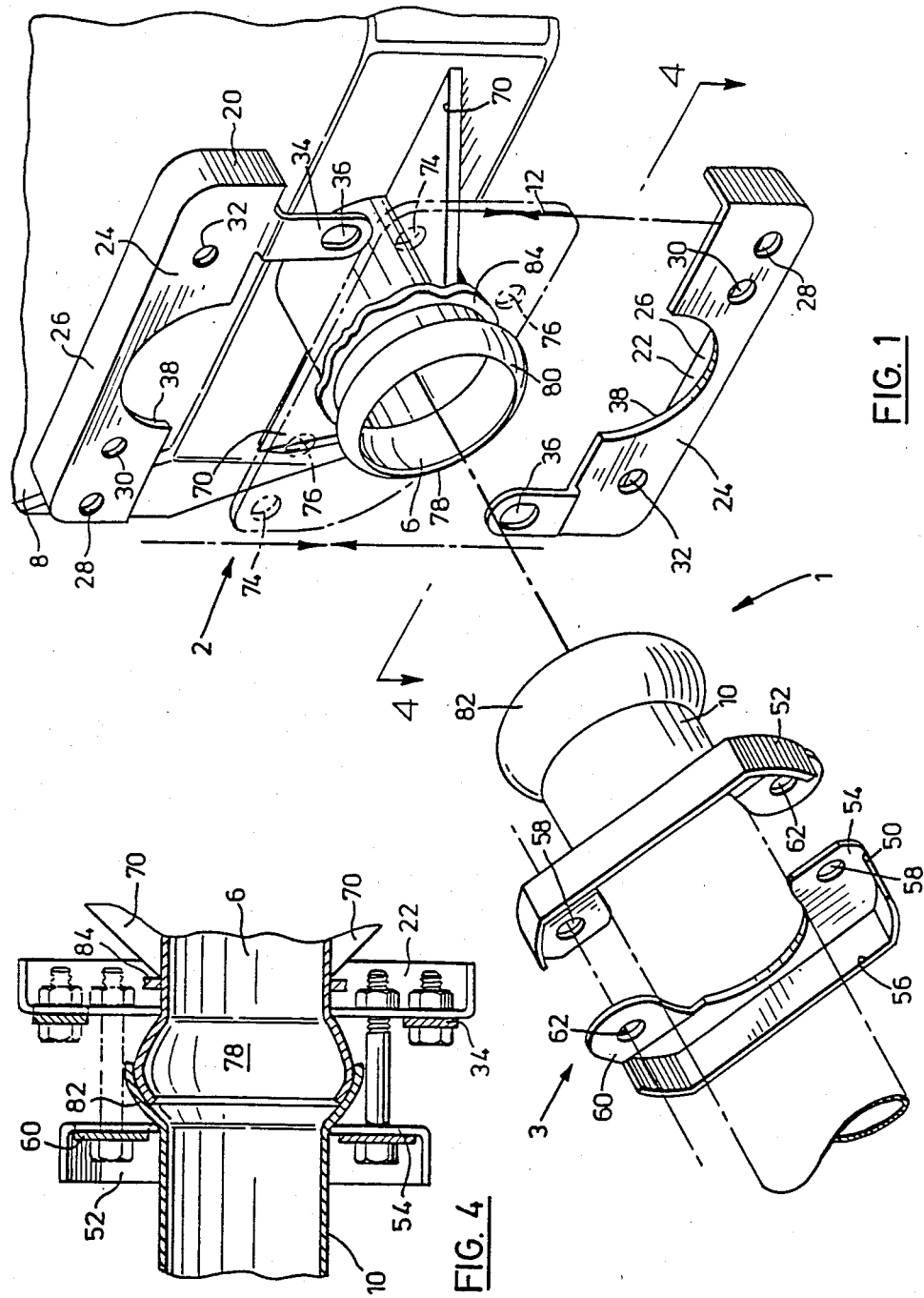
FIG. 1 shows a perspective exploded view of an outlet of a catalytic converter, and an end of a muffler pipe, and a support and clamping assembly according to the present invention.

The support and clamping assembly shown in the drawings is generally denoted by the reference 1, and comprises a first bracket generally denoted by the reference 2, and a second bracket generally denoted by the reference 3. For clarity, details of the bolts and studs holding the first and second brackets together are generally omitted.

In the drawings, there is also shown an outlet 6 of a catalytic converter. Part of the main body of the catalytic converter is shown as 8. Additionally, an end of a muffler pipe is shown as 10. Since the remainder of the catalytic converter and the muffler pipe are not relevant to the present invention, they are not shown. As is described in greater detail below, the original bracket for the catalytic converter 8 is indicated in outline at 12.

The first bracket 2 comprises a first bracket member 20, and a second bracket member 22. The bracket members 20, 22 are generally identical, and will be described in relation to the first bracket member 20. The bracket members 20, 22 are stamped from sheet steel. The bracket member 20 comprises a flat main portion 24, and continuous with this portion 24 around its outer edge a flange 26 of uniform depth. In the main portion 24, there are formed a first aperture 28, a hole 30 and an opening 32. Continuous with the main portion 24 is a projection 34 including an elongate second aperture 36. The portion 34 is pressed, so as to be stepped away from the main portion 24 by an amount equal to the thickness of the sheet steel from which the bracket 20 is formed. In the centre of the main portion 24, a semi-circular recess 38 is defined. For convenience of manufacture, the brackets 20, 22 are identical although the lower bracket member 22 does not require the opening 32 for attachment to a strap.

The second bracket 3 is similar to the first bracket 2 in some details. Again, the second bracket 3 is stamped from sheet steel. It comprises two bracket members 50 and 52, which are generally identical.

The bracket member 50 comprises a main portion or body 54 and a flange 56. The flange 56 is of uniform depth and extends around an outer edge of the main portion 54. At one end of the main portion 54, a hole 58 is formed. At the other end, a projection 60 is provided with a hole 62. Like the projection 34, the projection 60 is stepped relative to the main portion 54 by an amount equal to the thickness of the sheet metal. Both the holes 58 and 62 are round.

A description will now be given of the method of assembling the clamping assembly 1 of the present invention.

First, as noted above, the catalytic converter 8 is usually provided with a bracket as shown at 12. This is welded to the outlet pipe 6. Also, as shown, the outlet pipe 6 is braced by gussets 70 secured to it and the main body 8 of the catalytic converter. As shown in particular in FIGS. 2 and 3, in outline, straps 72 are provided for supporting the catalytic converter 8. Holes or openings 74 in the bracket 12 are bolted to these straps 72, to support the catalytic converter.

Also, in the original configuration, the end 10 of the muffler pipe is held against the outlet 6. For this purpose, the outlet 6 is provided with an enlarged portion 78, defining a conical coupling surface 80. Corresponding to this, the end 10 of the muffler pipe has an outwardly flared portion 82 defining a corresponding surface, which abutts the surface 80. To hold these couplings surfaces together, a bracket (not shown) is fixed around the end of the muffler pipe 10, in known manner. Bolts or studs are then provided extending between the brackets to pull the brackets, and hence the coupling surfaces, towards one another.

After a period of time, corrosion begins to effect the catalytic converter and the whole muffler system. Experience shows that one of the first components to fail or to become weakened is the bracket 12. It should be noted that bracket 12 can remain intact, but can be considerably weakened by corrosion. As a consequence, it is no longer rigid enough to ensure that a proper coupling is formed between the outlet 6 and the end 10 of the muffler pipe. Such an occurance may well only be detected when the muffler pipe is being replaced. When one attempts to bolt up the end of a new muffler pipe against the catalytic converter, it may become apparent that the bracket 12 is no longer rigid enough to enable a proper coupling to be formed. Alternatively, failure or weakening of the bracket 12 may occur before failure of the muffler system.

If it becomes necessary to replace the bracket 12, then it is first necessary to break the original connection or coupling between the catalytic converter and the muffler pipe. Before doing this, the catalytic converter and the muffler pipe are provided with adequate supports. Then, the bolts or studs holding the coupling together are removed, and the original bracket around the end 10 of the muffler pipe is removed. Although not shown, this original bracket can be similar to the second bracket 3, and can be reused. If desired to improve access, the end 10 of the muffler pipe can then be pulled away from the outlet 6. This then leaves the bracket 12 free to be cut away, either by, for example, a cutting torch. The bracket 12 was originally secured by welding, and a circular weld bead is indicated at 84. Owing to its greater thickness, the weld bead 84 rarely suffers significantly from corrosion. When removing the bracket 12, this weld bead 84 is left intact.

After removal of the bracket 12, the new first bracket 2 can be fitted. This is achieved, by simply placing the two bracket members 20 and 22 around the outlet 6, as indicated by the arrows in FIG. 1. The outlet 6 is then located in the recesses 38 of the bracket members 20, 22. The bracket members 20, 22 can either be located immediately behind the enlarged portion 78 of the outlet 6, or behind the weld bead 84. Either location is possible, although if one of these provides a better seat for the bracket then it should be used in preference. The stepping of the projections 34 enables the bracket members to be fitted together with their main portions 24 coplanar.

Figure 2:
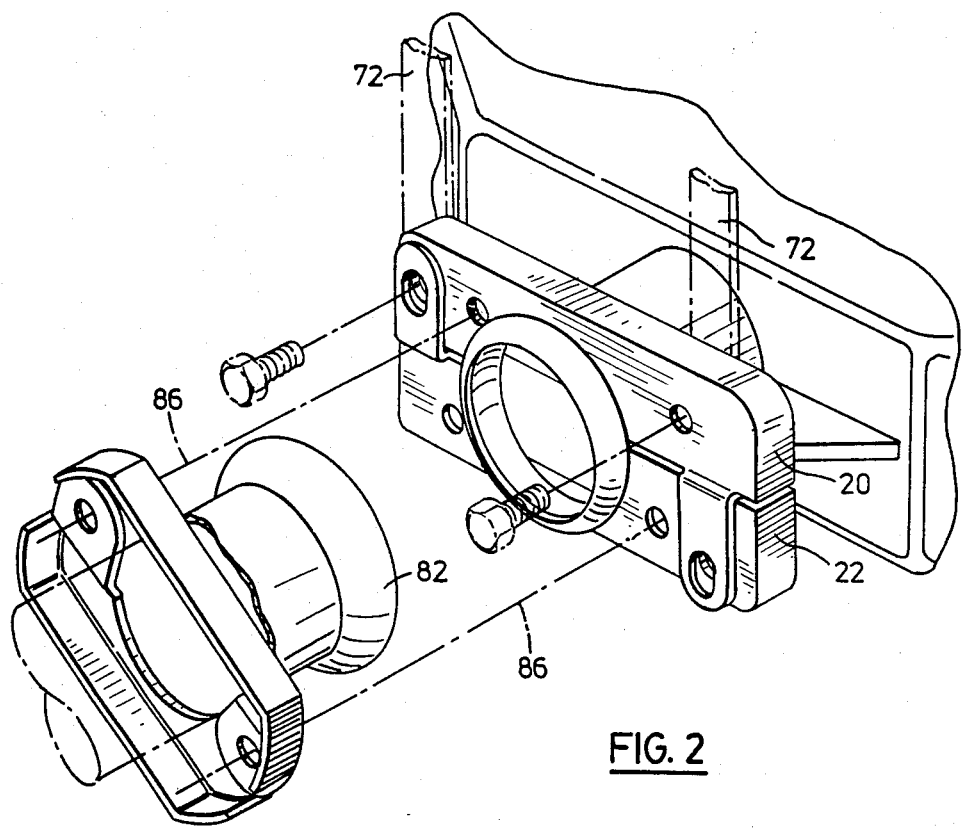
FIG. 2 shows a similar perspective view to FIG. 1, with the brackets of the assembly fitted in position.
Figure 3:
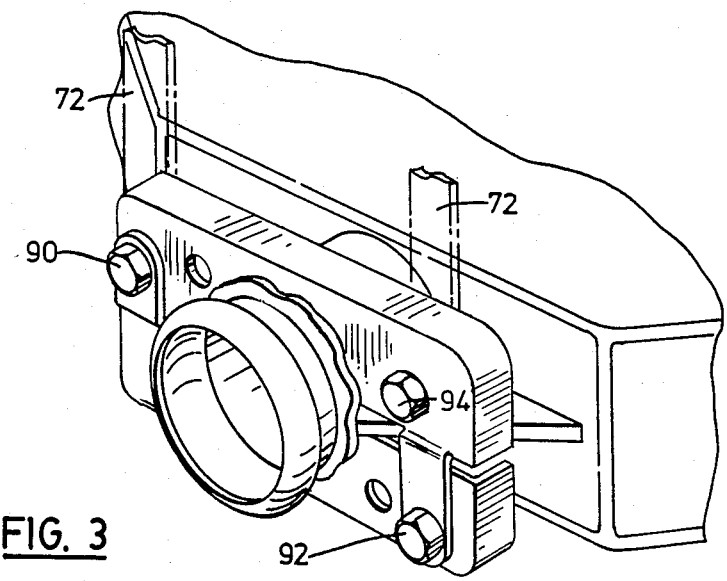
FIG. 3 shows an outlet of a catalytic converter with a first bracket of the assembly bolted in position.

As shown in FIGS. 2 and 3, with the clamping members 20, 22 assembled around the outlet 6, the first and second apertures 28, 36 are aligned with one another. Bolts 90, 92 and corresponding nuts (not shown) are then used to secure the members 20, 22 together. Note that the provision of elongated apertures 36 enables the clamping members 20, 22 to be assembled snugly against the outlet 6. As shown in FIGS. 2, 3 the bolt 90 can additionally serve to secure the first bracket 2 to one of the supporting straps 72. Another bolt 94 is provided passing through the opening 32 and the other strap 72, and is secured by another nut, to firmly mount the bracket 2 to the straps 72.

With the first bracket 2 mounted as shown in FIG. 3, the second bracket 3 can be mounted on the end 10 of the muffler pipe, and the muffler pipe can be reattached to the catalytic converter. For this purpose, the bracket members 50, 52 are assembled around the end 10 of the muffler pipe, as shown in FIG. 2. In view of the enlarged flared end portion 82 of the pipe 10, there is no need for the bracket 3 to be so tightly clamped against the end 10 of the muffler pipe. It is sufficient for there to be only a small tolerance between the bracket 3 and the end 10. Like the first bracket 2, the bracket 3 is assembled with the main body or portions 54 of the bracket members 50, 52 coplanar. With the bracket 3 assembled as shown in FIG. 2, studs are passed through the holes 58, 62 and through the holes 30 of the clamping members 20, 22. The lines 86 indicate the axes for these studs, although these studs themselves are not shown. Then, nuts are fitted to the ends of the studs, to draw the first and second bracket members 2, 3 towards one another. The first bracket member 2 is brought up against the weld bead 84 or flared end portion 78, depending on its mounting. The second bracket 3 is drawn up against the flared end portion 82. As a consequence, the flared end portion 82 is pressed against the coupling surface 80, to secure the muffler pipe to the catalytic converter.

It is to be appreciated that a variety of different arrangements can be provided for the connection between the brackets 2, 3 and for the connection of the bracket 2 to be straps 72. For example, the straps 72 can be connected to the bracket 2 by bolts which are provided solely for that purpose. Then, the bolt 90 would serve only to secure the two bracket members 20, 22 together. Alternatively, the upper stud holding the brackets 2, 3 together can also serve to secure the bracket 2 to the left hand strap 72 as viewed in FIG. 2. It is also possible to arrange the apertures 28, 36 and the holes 30, so that one strap 72 is secured to a bolt holding the bracket members 20, 22 together and the other strap is secured by a stud holding the brackets 2, 3 together. The openings 32 can then be eliminated.

Whilst the clamping or mounting assembly is shown with two brackets 2, 3 as previously noted, the bracket 3 can be similar to an existing bracket on the muffler pipe. If desired, the existing bracket can be used. It is then only necessary to provide the first bracket 2, and to fit it in place of the original bracket 12. This procedure is expected to be particularly advantageous when it is only the bracket 12 which is being replaced, the original muffler pipe and its associated brackets being retained. The bracket 2 would then be secured to the original bracket on the muffler pipe by bolts or studs in known manner.

The internal diameter of the opening defined by the two recesses 38 of the members 20, 22 is suitably dimensioned.

At the present time, an internal diameter in the range $2\frac{1}{2}''-2\frac{5}{8}''$ is fairly common, and covers a large number of vehicles. To provide better coverage, a supply of brackets 2 with different sized openings in the range $1\frac{1}{2}''-3''$ should be provided.

It is to be noted that in this specification, including the claims, the term "stud" is used to denote any suitable elongate threaded fastening element, and in particular is to be construed as covering a bolt which is considered to be a particular type of stud.

For ease of understanding and clarity, the terms "aperture", "opening" and "hole" are used to denote different openings etc in the bracket members, which generally provide a different function. In general they can all be similarly formed, and some or all of them can have the same dimensions.

Although the projections 34 are shown forward of the main portions or bodies 24 of the bracket members 20, 22, they could be formed so that they are stepped backwards. Then, in the view of FIG. 2, they would not be seen. Such an arrangement would have the advantage that, when the stud holding the brackets 2, 3 together also serves to hold the two bracket members 20, 22 together, the nut on the stud will hold the two bracket members 20, 22 together against the weld bead 84.

What I claim is:

1. A support and clamping assembly for clamping together an outlet pipe of a catalytic converter having an annular projection and an end of a muffler pipe having an outwardly flared end portion, and for supporting an outlet end of the catalytic converter, the support and clamping assembly comprising:

a first support bracket, which comprises first and second bracket members, which are substantially identical in shape and each of which has first and second diametrically opposed apertures for securing the bracket member together around the outlet pipe of a catalytic converter and a projection for overlapping the other bracket member and in which the second aperature is provided, the first and second apertures of one bracket member being complementary to the second and first apertures of the other bracket member, each of which bracket members defines a semicircular recess, the recesses together being capable of accommodating the outlet pipe of a catalytic converter, and each of which bracket members includes a hole for a stud which holes, in use, are diametrically opposed to one another, the first bracket member at least including an opening for attachment to a support strap; and a second bracket, which comprises third and fourth bracket members, which are substantially identical in shape and each of which includes third and fourth holes for securing the third and fourth bracket members together around a muffler pipe and a respective projection for overlapping the other of the third and fourth bracket members and in which the fourth hole is provided, the third and fourth holes of the third bracket member being complementary to the fourth and third holes of the fourth bracket member and the third and fourth holes of each bracket member being diametrically opposed and spaced by a diameter different from the diameter between the first and second apertures of the first bracket, and each of which bracket members includes a second, semicircular recess, the second recesses together being capable of accommodating a muffler pipe;

whereby, in use, the first bracket is assembled around the outlet pipe of a catalytic converter by means of bolts in the first and second apertures securing the first and second bracket members together, the first bracket being retained by said annular projection of the outlet pipe, and the second bracket is assembled around the end of a muffler pipe by means of studs located in the third and fourth holes, the second bracket being retained by said flared end portion of the muffler pipe and the studs further passing through the holes of the first and second bracket members to secure the first and second brackets together and thereby secure the muffler pipe to the outlet pipe of the catalytic converter.

2. A support and clamping assembly as claimed in claim 1, wherein each of the first and second bracket members comprises a main body portion, which is generally flat, and a flange around a portion of the outer edge which is not adjacent the other of the first and second bracket members when the first bracket is assembled, the flange extending generally perpendicular to the main body portion.

3. A support and clamping assembly as claimed in claim 2, wherein each of the first and second bracket members has a generally rectangular profile, and the respective recess is provided centrally in a longer side of the rectangular profile.

4. A support and clamping assembly as claimed in claim 3, wherein the projection of each of the first and second bracket members extends from said longer side of the rectangular profile adjacent one end of the bracket member and is stepped away therefrom by an amount equal to the thickness of the main body portion, and wherein, for each of the first and second bracket members, the first aperture is provided in the main body portion spaced from said longer side and the second aperture is provided in the respective projection remote from the main body portion, whereby the projections brace the first and second bracket members to maintain their body portions co-planar.

5. A support and clamping assembly as claimed in claim 4, wherein for, each of the first and second bracket members, the first aperture is circular and the second aperture is elongate, to permit the first bracket to be assembled tightly around the outlet of a catalytic converter.

6. A support and clamping assembly as claimed in claim 5, wherein each of the first and second bracket members includes an opening in the main body portion, for attachment to a support strap.

7. A support and clamping assembly as claimed in claim 1 2 or 6, wherein each of the first and second bracket members is pressed from sheet steel.

8. A support and clamping assembly for clamping together an outlet pipe of a catalytic converter having an annular projection and an end of a muffler pipe having an outwardly flared end portion, and for supporting an outlet end of the catalytic converter, the support and clamping assembly comprising:

a first support bracket which comprises first and second bracket members, each of which is sheet form, has a generally rectangular profile, and comprises a main body portion, which is generally flat, a flange around a portion of the outer edge of the main body portion, except for a longer side thereof which is adjacent the corresponding longer side of the other of the first and the second bracket members when the first bracket is assembled, the flange extending generally perpendicularly to the main body portion, a projection, which extends from the longer side of the rectangular profile adjacent one end of the bracket member, and which is stepped away therefrom by an amount equal to the thickness of the main body portion, a first, circular aperture in the main body portion remote from said longer side, a second, elongate aperture in the projection remote from said longer side, a semicircular recess in said longer side for forming a first circular recess with the semicircular recess of the other of the first and second bracket members, with the first and second apertures being diametrically opposed relative to the first circular recess and being complementary to the second and first aperture of the other of the first and second bracket members, for securing the first bracket around an outlet of a catalytic converter, a hole for a stud, and an opening for a bolt to attach the first bracket to a support strap; and a second bracket, which comprises third and fourth bracket members, which are substantially identical and sheet-form and each of which comprises a substantially planar main body portion, and a flange extending from a portion of the edge of the main body portion which is not adjacent the other of the third and fourth bracket members, when the second bracket is assembled, a second projection which extends from the main body portion and is stepped away therefrom by an amount equal to the thickness thereof, a third circular hole in the main body portion, a fourth circular hole in the second projection, a semicircular recess for forming a second, circular recess with the semicircular recess of the other of the third and fourth bracket members, with the third and fourth holes being diametrically opposed to one another relative to the second, circular recess and being complementary to the fourth and third holes respectively of the other of the third and fourth bracket members for securing the second bracket around an end of a muffler pipe; whereby, in use, the first bracket is assembled around the outlet pipe of a catalytic converter by means of bolts in the first and second apertures securing the first and second bracket members together, the first bracket being retained by said annular projection of the outlet pipe, the second bracket is assembled around the end of a muffler pipe by means of studs located in the third and fourth holes, the second bracket being retained by said flared end protion of the muffler pipe and the studs further passing through the holes of the first and second bracket members to secure the first and second brackets together and thereby to secure the muffler pipe to the outlet pipe of a catalytic converter, and one support strap is secured by a bolt to an opening of the first bracket and another support strap is secured by one bolt in one pair of first and second apertures.

9. An exhaust assembly of a vehicle including:

a catalytic converter having an outlet pipe and an annular projection around the outlet pipe;

a muffler pipe having a flared end for attachment to the outlet pipe of the catalytic converter;

a support and clamping assembly as claimed in claim 1 or 8 including bolts and studs for securing the brackets in position, with the first bracket positioned around said outlet and the first and second bracket members secured together by bolts, with the second bracket located around the end of the muffler pipe and the third and fourth bracket members secured together by studs that pass through the holes of the first bracket to secure the muffler pipe to the catalytic converter;

and two support straps, one of which is secured by a bolt to an opening of the first bracket and the other of which is secured to the first bracket by a bolt in one pair of the first and second apertures.

* * * * *